Oct. 28, 1952 — W. W. CROW — 2,615,460
VIBRATION RESPONSIVE SAFETY CUTOFF VALVE
Filed Aug. 31, 1949 — 3 Sheets-Sheet 1

INVENTOR.
William Willis Crow
BY Victor J. Evans & Co.
ATTORNEYS

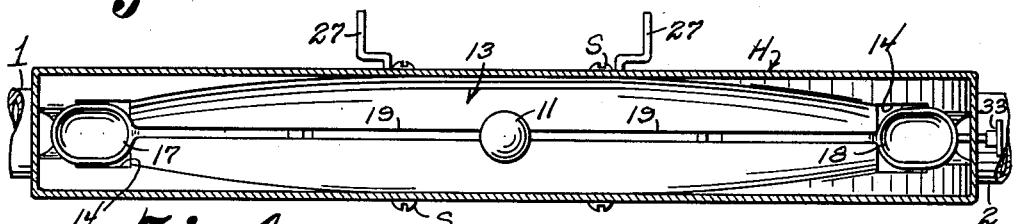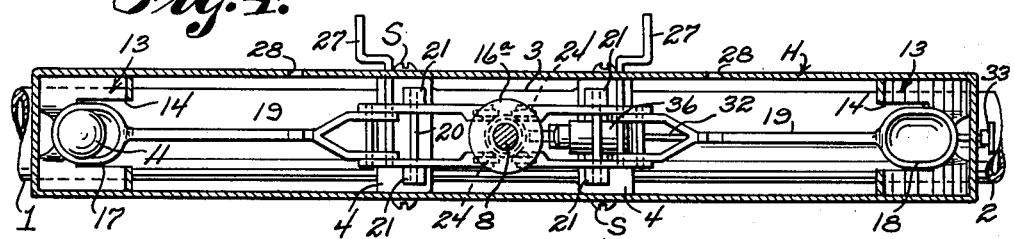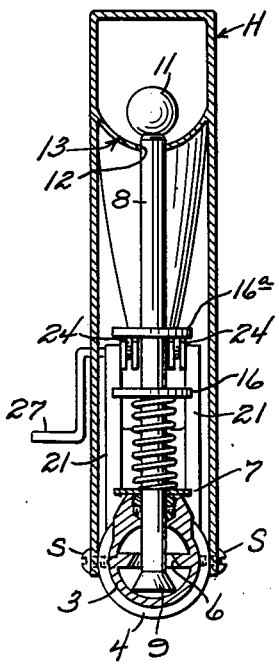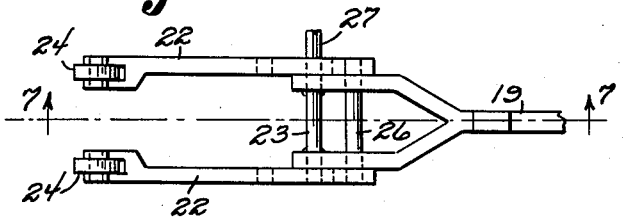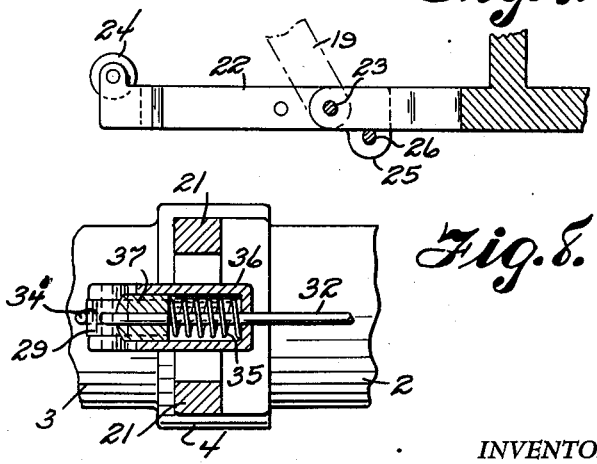

Oct. 28, 1952 — W. W. CROW — 2,615,460
VIBRATION RESPONSIVE SAFETY CUTOFF VALVE
Filed Aug. 31, 1949 — 3 Sheets-Sheet 3

INVENTOR.
William Willis Crow
BY Victor J. Evans & Co.
ATTORNEYS

Patented Oct. 28, 1952

2,615,460

UNITED STATES PATENT OFFICE 2,615,460

VIBRATION RESPONSIVE SAFETY CUTOFF VALVE

William Willis Crow, Bell Gardens, Calif.

Application August 31, 1949, Serial No. 113,416

1 Claim. (Cl. 137—38)

My present invention relates to safety devices in the distribution systems of gases and liquids, and more specifically to an automatic safety gas valve of the vibration-activated type, which while well adapted for various purposes and uses is especially designed for installation in a main pipe line for emergency use in automatically cutting off the source of supply of gas in the event the line is ruptured or broken, to prevent escape and loss of gas from a portion of the pipe line or its connections.

Under force of earthquakes, tornadoes, and similar violent disturbances, main gas pipe lines are frequently ruptured or broken, thereby releasing the piped gas, which, in addition to waste and loss of the gas, presents a fire hazard or menace that might result in property losses. The primary purpose of the appliance of my invention, is the provision of a safety device, one or more of which may be installed as component parts or sections of the pipe line, and equipped with weight-controlled means to normally permit free flow of the gas under pressure. Under vibratory movements of the pipe line the weight controlled means or mechanism is activated to permit operation of means under action of gravity, or spring-lifting means, for closing the normally open valve device, to shut off the gas supply.

The safety valve mechanism includes a minimum number of parts that may with facility be manufactured at low cost of production, and the parts may be assembled with convenience, to provide a unitary structure that may readily be installed as a component part of the pipe line, and which is reliable in the performance of its required functions.

The invention consists in certain novel features of construction and combinations and arrangements of parts as will hereinafter be described and more particularly pointed out in the appended claim.

In the accompanying drawings I have illustrated a complete example of a physical embodiment of my invention in which the parts are combined and arranged in accord with one mode I have devised for the practical application of the principles of the invention. It will however be understood that changes and alterations are contemplated and may be made in these exemplifying structures and drawings, within the scope of my claim, without departing from the principles of the invention.

Figure 3 is a horizontal sectional view at line 3—3 of Fig. 1; and Figure 4 is a similar view at line 4—4 of Fig. 2.

Figure 5 is a vertical sectional, transverse view at line 5—5 of Fig. 1.

Figure 6 is an enlarged detail plan view showing a portion of one of the flexible levers for the valve;

Figure 7 is a sectional view at line 7—7 of Figure 6;

Figure 8 is a detail sectional view at line 8—8 of Figure 1;

Figure 1:
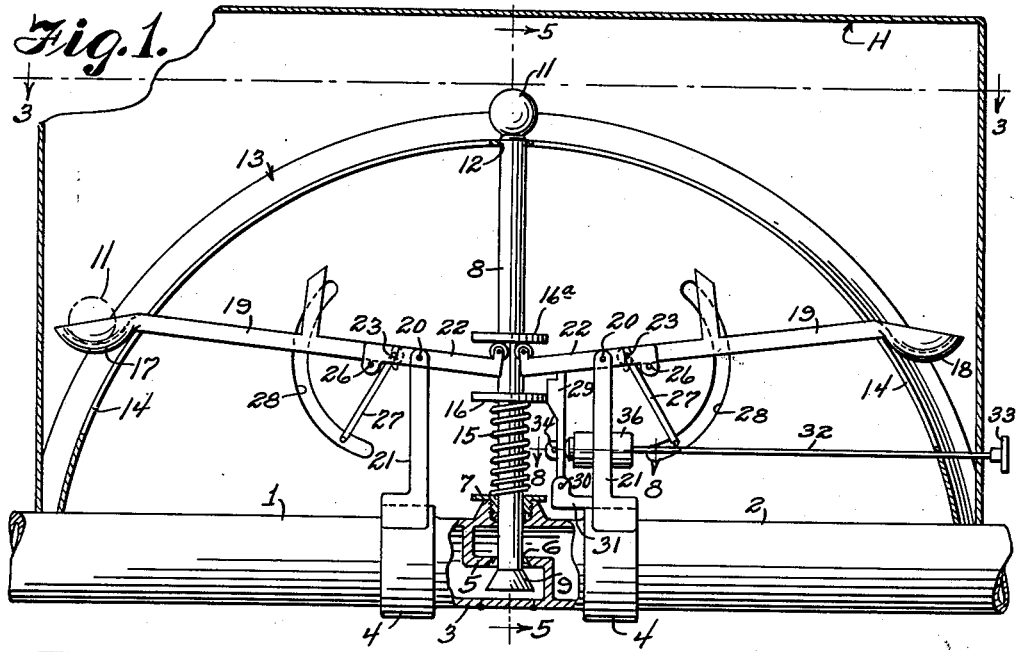
Figure 1 is a view in elevation, with the housing in section, of the safety appliance, with the valve in open position.

In order that the general arrangement and utility of parts may readily be understood I have indicated at 1 and 2 spaced sections of a conventional gas pipe line through which the gas flows under pressure, and the adjoining ends of these sections are connected by a valve casing 3, the bell ends 4 of which are threaded on the pipe sections. The valve casing is fashioned with an interior angular partition 5, forming intake and outlet chambers, a central upright opening and valve seat 6, and a stuffing box or gland 7 is provided at top center of the casing in alinement with the valve seat.

For controlling the flow of gas through the valve seat an upright valve stem 8 is provided at its lower end with an inverted cone-shaped valve 9 adapted to close the seat, and the upper end of the stem is fashioned with a concave seat of sufficient size and shape to support a spherical weight or ball 11. The valve stem is supported for vertical movement in opening and closing the valve seat by means of the stuffing box or packing gland of the valve casing, and the upper end of the stem projects through bore or orifice 12 drilled in an arched bridge or semi-circular and upright track 13, concave in cross section, and mounted at its ends on the pipe sections 1 and 2. From the annular bearing bore 12 of the bridge or track two oppositely arranged slots 14, 14, extend down toward the tapered ends of the bridge, and the operating parts of the safety valve are enclosed within a housing H that is fastened, as by screws S, to the bell ends of the valve casing.

The valve is depressed and held open by the weight of the ball 11, and the weight of the ball and stem is balanced by means of a spring 15 coiled about the stem and interposed between the flange of the stuffing box 7 and another, spaced, flange 16 fixed on the valve stem, in order that when the ball is dislodged from its seat the expansion of the spring aids in closing the valve in its seat.

If and when vibratory movements are imposed on the pipe line, and the weight or ball is dislodged from its seat, the ball rolls, in either direction to the right or left in Fig. 1 down the runway or track 13, and finds rest in a waiting cup or receptacle 17, or 18, as the case may be, each cup being mounted on the free or outer end of a pair of folding levers having lever arms 19. These opposed lever arms 19 are pivoted at 20 on upright brackets 21 attached at their bases to the bells of the valve casing, and each arm, at its inner end, is equipped with a shorter lever arm 22 that is pivoted at 23 to the longer arm 19. The lever arms 22 are of forked formation, and each tine of a fork is equipped with a journaled roller 24; and to hold these folding levers in alined operative position, the outer ends of the short forked arms are flanged as at 25 and provided with a retaining pin or cross detent 26 that coacts with the longer arm.

Figure 2:
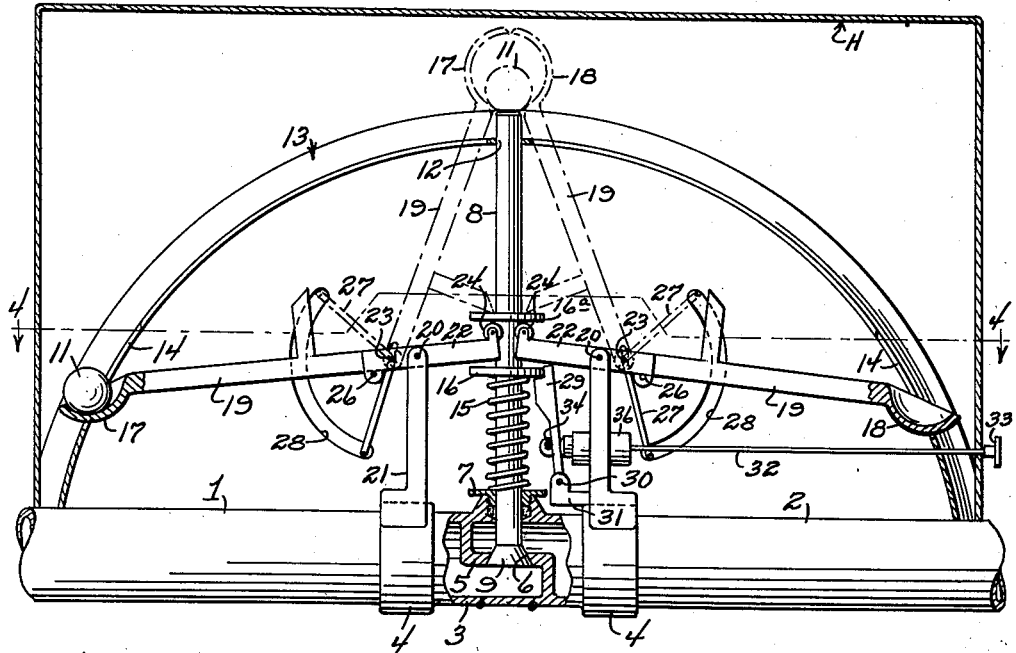
Figure 2 is a similar view with the valve in closed position.

The lever arms 19 are movable in and guided by the side walls of the slots 14 in the runways or tracks of the arched bridge, and they are hinged to the shorter arms 22 at 23 so that the longer lever arms may be folded up to the upright dotted positions in Fig. 2, and for this purpose a resetting crank handle 27 forms an angular extension of each of the hinge pins 23, and the housing side wall is slotted at 28 to accommodate the crank handle as it is manipulated from the exterior of the housing.

The four rollers 24 which project upwardly from the two forked ends of the shorter arms of the levers frictionally engage the under face of an annular flange or head 16a rigidly mounted on the valve stem and spaced a slight distance above the complementary flange or disk 16, and as the weight of a ball depresses a lever the shorter arm of the lever in engagement with the disk or flange 16a lifts the valve stem to close the valve in its seat of the valve casing.

For retaining the valve in uplifted closed position an upright latch 29 is pivoted at 30 on a bracket 31 adjacent the valve stem in position to engage under the flange or head 16 as indicated in Fig. 2, and the latch is spring-pressed into coaction with the flange. For this automatic engaging action the latch is provided with a resetting or releasing rod 32 that extends through a slot in the housing and is provided with a handle 33 for manual operation. The inner end of the rod engages the latch at 34, and the rod passes through a spring 35 and its housing 36, with a guide plunger 37, coacting to push the latch toward the flange 16 so that the latch will snap into engagement with the flange and be retained to uphold the valve and valve stem.

By means of the crank handles, the two long arms of the levers may be swung upwardly or folded inwardly so that the two cups or receptacles will enclose the ball while the weight of the ball holds the valve stem with the valve in depressed or open position. Under vibratory movement the ball may be dislodged, and, striking against one of the cups, swings a lever arm downwardly. The ball as a weight depresses the lever arm into alignment with the shorter lever arm, and then the straightened lever is further depressed, its shorter arm is uplifted, and the valve stem is elevated to close the valve.

The auxiliary spring 15 is compressed when the valve is depressed to open position, and the weight of the ball overbalances the tension of the spring until the ball is dislodged, then the spring expands and initiates the closing movement of the valve.

Figure 9:
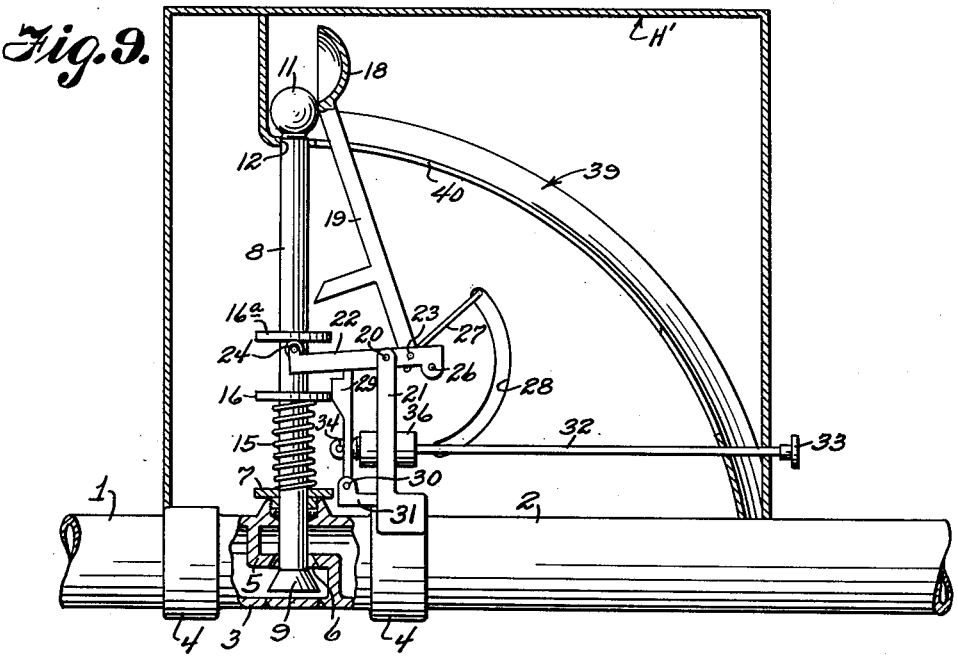
Figure 9 is a side elevational view of a modified safety appliance, with parts broken away and in section, and with the valve in open position.
Figure 10:
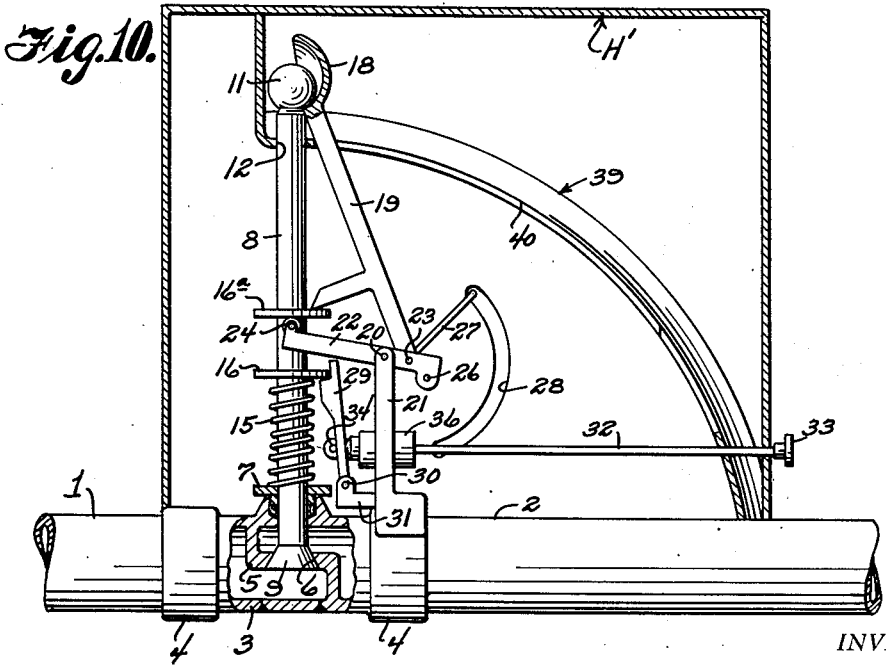
Figure 10 is a view similar to Figure 9, but with the valve in closed position.

Referring now to Figures 9 and 10 of the drawings, there is shown a modified safety appliance that has approximately the same construction and method of operation as the device of Figures 1 through 8. However, in the device of Figures 9 and 10, only one of the lever arms 19 and its cooperating mechanism is provided rather than having a pair of lever arms 19. The appliance of Figures 9 and 10 is again used with the pipe sections 1 and 2 which have the valve casing 3 interposed therebetween.

The safety appliance includes the stem 8 for moving the valve 9 into closing relation with respect to the seat 6. A track 39 is provided, and the track 39 has a longitudinally extending slot 40. The valve 9 is held open by the weight of the ball 11, the weight of the ball being balanced by the spring 15. Normally, the ball and other parts of the appliance are in the position shown in Figure 9, and when vibratory movements are imposed on the pipe line, the ball 11 is dislodged from its seat, the ball rolls onto or into the cup 18 which is mounted on the end of the lever arm 19. The lever arm 19 is pivoted at 20 to an immobile bracket 21, and the arm 19 has a short lever arm 22 pivoted thereto by a pin 23.

The lever arm 19 is moveable in and guided by the sidewalls of the slot 40 in the track. Rollers 24 project from the ends of the lever 22 and frictionally engage a disc 16a, whereby the valve stem 8 will be lifted to close the valve 9 on its seat, when the ball 11 is dislodged as previously described. The lever arm 19 may be reset by means of the crank handle 27 which projects through the slot 28 in the housing H'.

For retaining the valve in uplifted closed position there is again provided a latch 29 which is pivoted at 30 to the bracket 31. The latch 29 is adapted to engage under the flange 16 and the latch 29 is spring pressed and actuated by the previously disclosed rod 32. By using the safety appliance of Figures 9 and 10, the gas line will be closed by an apparatus which is more simple and inexpensive to manufacture than the apparatus of Figures 1 through 8, since fewer parts are required.

Having thus fully described my invention, what I claim as new and desire to secure by Letters Patent is:

In a vibrating control mechanism, in combination, a valve casing having a valve therein, an upright valve stem projecting through the casing and connected to said valve and provided with a concave seat on its upper end, a ball adapted to be positioned in said seat, an arcuate track provided with a bore for the projection therethrough of said stem, there being a pair of oppositely arranged slots extending along said track, a stuffing box in said casing circumposed on said valve stem, a flange arranged on said stem above said stuffing box, a coil spring interposed between said flange and stuffing box, a pair of oppositely disposed levers slidably extending through said slots, a cup mounted on the outer end of each of said levers, a bracket pivotally supporting each of said levers, an arm pivotally connected to each of said levers, said arms being of forked construction to provide tines, a disc spaced above said flange and secured to said stem, a roller journalled in each of said tines for engagement with said disc, a latch engaging said flange for maintaining said valve stem in raised position, a resetting rod having one end connected to said latch, and a handle mounted on the other end of said resetting rod.

WILLIAM WILLIS CROW.

REFERENCES CITED

The following references are of record in the file of this patent:

UNITED STATES PATENTS

| Number | Name | Date |
|---|---|---|
| 376,163 | Ross | Jan. 10, 1888 |
| 433,274 | Coe | July 29, 1890 |
| 449,195 | Berry | Mar. 31, 1891 |
| 1,302,749 | Yeamans | May 6, 1919 |
| 1,483,250 | Sturman | Feb. 12, 1924 |
| 2,054,563 | Ransen | Sept. 15, 1936 |